Sept. 1, 1942.                E. A. EDWARDS                2,294,540
              INSTRUMENT FOR MEASURING EFFECTIVE TEMPERATURES
                          Filed Dec. 1, 1939

INVENTOR.
EVAN A. EDWARDS
BY D. Clyde Jones
ATTORNEY.

Patented Sept. 1, 1942

2,294,540

UNITED STATES PATENT OFFICE 2,294,540

INSTRUMENT FOR MEASURING EFFECTIVE TEMPERATURES

Evan A. Edwards, Rochester, N. Y., assignor to Taylor Instrument Companies, Rochester, N. Y., a corporation of New York Application December 1, 1939, Serial No. 307,134

8 Claims. (Cl. 73—336)

It has long been known that a dry bulb thermometer reading alone is not a reliable measure of body comfort, since other factors such as the moisture content of the environmental air and the motion or velocity of this air are of real importance in such a measurement. This may be expressed in another way by saying that at a given temperature a person feels better on a damp still day than he does on a day when the air is relatively dry or in motion.

From this it will be appreciated that there are various permutations and combinations of temperature, relative humidity and air motion which result in the same feeling of comfort or discomfort. The various combinations of these factors are conveniently referred to as "thermo-equivalent conditions" or more generally as "effective temperatures" or "comfort indexes." A scale of effective temperature in terms of dry bulb temperature and relative humidity at various air velocities has been developed as a result of elaborate experiments conducted by the Research Laboratory of the United States Bureau of Mines at Pittsburgh, Pennsylvania. Instruments have also been proposed for measuring effective temperature but these instruments have been of complicated construction and are expensive to manufacture.

It is therefore the purpose of the present invention to provide a simple inexpensive instrument for measuring effective temperatures.

Figure 1:
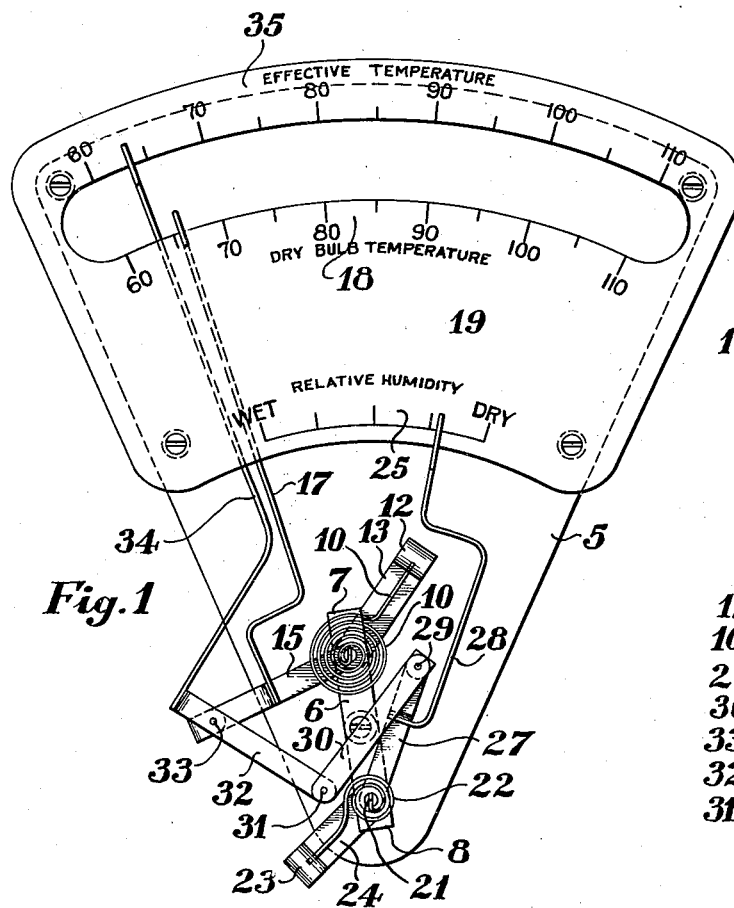
Figure 2:
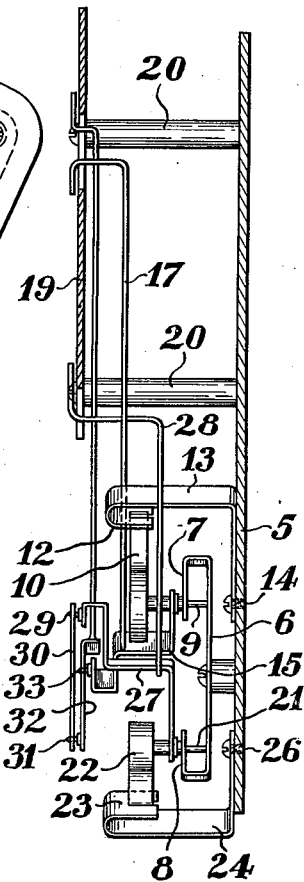
Figure 3:
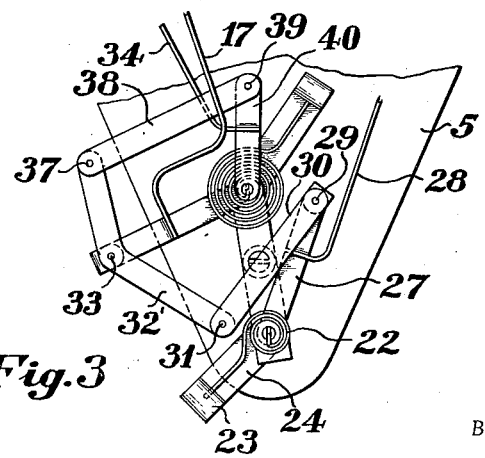

The various features and advantages of the invention will appear from the detailed description and claims when taken with the drawing in which Fig. 1 is a front elevation and Fig. 2 is a side elevation, partly in section, of one form of the invention; and Fig. 3 is a fragmentary showing of a modified form of the invention.

The effective temperature indicator of the present invention includes a base plate 5 on which there is mounted a support 6. This support has its main portion generally parallel to the plate 5, but its ends are bent back upon itself in spaced overlapping relation as indicated at 7 and 8. Each of the overlapping end portions 7 and 8 have a pair of alined openings to provide bearings for the arbors of the instrument. In the pair of openings in the end 7, there is pivotally mounted the arbor 9, the free end of which is provided with a kerf to receive one end of a spirally arranged thermosensitive bimetallic strip 10. The other end of this strip is received in a notch in the reversely bent end 12 of a bracket 13 fastened by a screw 14 to the base plate. The arbor 9 has secured thereto an arm 15 which carries an index 17, movable in relation to the dry bulb temperature scale 18 on the dial 19. This dial is preferably mounted in spaced parallel relation to the base plate 5 by means of the posts 20. The portion of the instrument just described serves to indicate the dry bulb temperature and may be of any conventional construction.

In the pair of bearing holes in the end 8 of the support, there is mounted a second arbor 21. The free end of this arbor is also provided with a kerf to receive one end of a spirally wound strip 22 made of moisture-responsive material. The construction of this element may be in accordance with the usual practice, for example, it may consist of a strip of paper metallized on one surface and thereafter wound into spiral form. While one end of this strip is attached to the arbor 21 as mentioned, the other end thereof is received in a notch in the reversely bent end 23 of a bracket 24 which is secured to the plate 5 by means of a screw 26. The arbor 21 also has secured thereto the arm 27 which is of such length and such shape that its free end can be swung into registry with the axis of the arbor 9. Arm 27 has secured thereto an index 28 which is movable over the relative humidity scale 25 on the dial 19.

Since the effective temperature is a resultant of the combined effects of the dry bulb temperature and the relative humidity, the arms 15 and 27, respectively actuated by the dry bulb temperature element and by the moisture indicating element, are interconnected by a linkage such that the resultant of these two effects gives a correct indication in terms of effective temperature. The free end of the arm 27 is pivoted at 29 to one end of the link 30, the other end of this link being pivoted at 31 to an effective temperature arm or lever 32. This lever is pivoted at 33 intermediate its ends, to the arm 15 which, it will be recalled, is moved in response to dry bulb temperature changes. The free end of the lever 32 carries an index 34 in operative relation to the effective temperature scale 35 on the dial 19. The arms 15, 30 and 32 are of equal effective lengths so that when the pivot 29 is superimposed over the axis of the arbor 9, these parts describe an equilateral triangle. In this construction when the pivot 29 is in alinement with the axis of the arbor 9, the index 28 should indicate 100% relative humidity and the indexes 17 and 34 will continue in alinement as they travel along their respective scales. Also, these indexes will remain in alinement at approximately 46° dry bulb temperature even when the relative humidity varies throughout the range of the instrument. This last condition arises from the fact that the pivot 31 will be in axial alinement with the arbor 21 of the moisture responsive strip 22. Thus both the arm 27 and the link 30 will swing about the axis of the arbor 21, as the moisture conditions change and consequently the lever 32 is not swung thereby at this time.

In the form of the invention disclosed in Figs. 1 and 2, the effective temperature index 34 does not swing in the true arc of a circle. While this does not affect the accuracy of the effective temperature indication, in a more highly refined instrument it is desirable to have the free end of the effective temperature index swing in a true arc. An arrangement for effecting this result is disclosed in the modified form of the invention illustrated in Fig. 3. In this form of the invention the upper end of the effective temperature arm or lever 32', as illustrated, is pivoted at 37 to one end of a link 38. The other end of this link is pivotally connected at 39 to an arm 40 which is mounted to swing on an axis in alinement with the arbor 9. Any convenient arrangement for effecting this result may be utilized, for example, the free end of the arbor 9 may serve as a bearing. In this form of the invention, the effective temperature index is carried by the arm 40 and since the arm 40 swings about a fixed center, the index 34 carried thereby, will have its free end travel in the arc of a circle.

For simplicity in disclosure, the device has been described and illustrated as covering only the range of conditions involved in room temperature. It will be understood, however, that by increasing the range action the instrument may be made to operate at temperatures both above and below a given dry bulb temperature, for example, 46° F. It will also be understood that the various components of the mechanism may be arranged on the opposite sides of a vertical center line, or as though Fig. 1 were a view from the rear of the instrument. All variations of the mechanism that are mentioned, employ the same principle of operation as described and shown in the body of the application.

I claim:

1. In an effective temperature measuring unit, a primary arm movable about a fixed pivot, means responsive to relative humidity for moving said arm, a secondary arm movable about a fixed pivot spaced from said first pivot, means responsive to dry bulb temperature for moving said secondary arm, said primary arm having an effective length approximately equal to the distance between said fixed pivots, a primary link having an effective length approximately equal to that of said primary arm and pivoted at one end to the free end of said primary arm, a secondary link pivoted at one end to the other end of said primary link and at an intermediate point thereof on one end of said secondary arm, and an index movable in accordance with the movement of said secondary link.

2. In an effective temperature measuring unit, a primary arm movable about a fixed pivot, means responsive to relative humidity for moving said arm, a secondary arm movable about a fixed pivot spaced from said first pivot, means responsive to dry bulb temperature for moving said secondary arm, said primary arm having an effective length approximately equal to the distance between said fixed pivots, a primary link pivoted at one end to the free end of said primary arm, a secondary link pivoted at one end to the other end of said primary link and at an intermediate point thereof on one end of said secondary arm, said primary link and said secondary link each having an effective length approximately equal to the effective length of said primary arm, and an index movable in accordance with the movement of said secondary link.

3. In an effective temperature measuring unit, a primary arm movable about a fixed pivot, means responsive to relative humidity for moving said arm, a secondary arm movable about a fixed pivot spaced from said first pivot, means responsive to dry bulb temperature for moving said secondary arm, said primary arm having an effective length approximately equal to the distance between said fixed pivots, a primary link pivoted at one end to the free end of said primary arm, a secondary link pivoted at one end to the other end of said primary link and at an intermediate point thereof on one end of said secondary arm, said primary arm and said secondary arm as well as said primary link and said secondary link having approximately equal effective lengths, and an index movable in accordance with the movement of said secondary link.

4. In an effective temperature measuring unit, a primary arm movable about a fixed pivot, means responsive to relative humidity for moving said arm, a secondary arm movable about a fixed pivot spaced from said first pivot, means responsive to dry bulb temperature for moving said secondary arm, an arm movable to indicate effective temperature, said arm being movable about an intermediate point thereof on a swinging pivot carried by said secondary arm, a link pivoted at one end to one end of said effective temperature arm and at its other end to one end of said primary arm, one of the pivots of said link being movable into substantial registry with the pivot of said primary arm and the other pivot of said link being movable into substantial registry with the pivot of said secondary arm.

5. In an effective temperature measuring device, a primary arm movable about a fixed pivot, means responsive to relative humidity for moving said arm, a secondary arm movable about a second fixed pivot spaced from said first pivot, means responsive to dry bulb temperature for moving said secondary arm, an arm movable to indicate effective temperature, said arm being pivoted on said secondary arm, a link connecting said effective temperature arm to said primary arm, one end of said link being movable proportionately to changes in relative humidity from a position in substantial registry with said second fixed pivot, the other end of said link being movable in response to the joint action of said primary and secondary arms, said last-mentioned movement being from a position in substantial registry with said first fixed pivot.

6. In a device of the class described, a primary arm movable about a fixed pivot, means responsive to relative humidity for moving said arm, a second arm movable about a fixed pivot spaced from said first pivot, means responsive to dry bulb temperature for moving said second arm, a third arm, means including said second arm for bodily moving said third arm generally lengthwise in an arcuate path, means including said primary arm for swinging at least one end of said third arm in one of several arcs intersecting said path, the arc in which said last-mentioned movement takes place being determined by the dry bulb temperature, and an index operated by the mentioned end of said third arm.

7. In a device of the class described, a dial provided with a dry bulb temperature scale, a relative humidity scale and an effective temperature scale, an index movable with respect to said dry bulb temperature scale about a fixed center, means responsive to changes in dry bulb temperature for moving said index accordingly, a second index movable with respect to said relative humidity scale about another fixed center spaced from said first fixed center, means for moving said second index in accordance with variations in relative humidity, a third index movable about a fixed center with respect to said effective temperature scale, an arm for actuating said third index, a pivot about which said arm is rotatable, means responsive to the movement of said first index for adjusting said pivot in an arcuate path as a function of the temperature and means responsive to the movement of said second index for effecting rotary movement of said arm as a function of humidity.

8. In a device of the class described, a dial provided with a dry bulb temperature scale, a relative humidity scale, and an effective temperature scale, an index movable with respect to said dry bulb temperature scale about a fixed center, means responsive to changes in dry bulb temperature for moving said index accordingly, a second index movable with respect to said relative humidity scale about another fixed center spaced from said first fixed center, means for moving said second index in accordance with variations in relative humidity, a third index movable with respect to said effective temperature scale, an arm for actuating said third index, a pivot about which said arm is rotatable, means responsive to the movement of said first index for adjusting said pivot in an arcuate path as a function of temperature and means responsive to the movement of said second index for effecting rotary movement of said arm as a function of humidity.

EVAN A. EDWARDS.